(12) United States Patent
Jeong et al.

(10) Patent No.: US 11,732,189 B2
(45) Date of Patent: Aug. 22, 2023

(54) QUANTUM DOTS AND METHOD OF MANUFACTURING QUANTUM DOTS

(71) Applicant: RESEARCH & BUSINESS FOUNDATION SUNGKYUNKWAN UNIVERSITY, Suwon-si (KR)

(72) Inventors: Sohee Jeong, Seoul (KR); Youngsik Kim, Daejeon (KR); Hyekyoung Choi, Daejeon (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 128 days.

(21) Appl. No.: 17/392,414

(22) Filed: Aug. 3, 2021

(65) Prior Publication Data

US 2021/0371746 A1    Dec. 2, 2021

Related U.S. Application Data

(63) Continuation of application No. PCT/KR2020/005594, filed on Apr. 28, 2020.

(30) Foreign Application Priority Data

May 8, 2019   (KR) .................. 10-2019-0053735
Apr. 24, 2020 (KR) .................. 10-2020-0049760

(51) Int. Cl.
  *C09K 11/88*   (2006.01)
  *C01B 25/08*   (2006.01)
  (Continued)

(52) U.S. Cl.
  CPC .......... *C09K 11/883* (2013.01); *C01B 25/087* (2013.01); *C09K 11/0883* (2013.01);
  (Continued)

(58) Field of Classification Search
  CPC ... C09K 11/883; C09K 11/0883; C09K 11/70; C09K 11/7492; C01B 25/087;
  (Continued)

(56) References Cited

U.S. PATENT DOCUMENTS 6,855,202 B2*  2/2005  Alivisatos ............... C30B 7/00
                                                    977/773
2018/0106460 A1*  4/2018  Van Bommel ........ F21V 29/502
(Continued)

FOREIGN PATENT DOCUMENTS

KR    10-2004-0076253 A    8/2004
KR       10-1043311 B1     6/2011
(Continued)

OTHER PUBLICATIONS

Shin, Dongwoon, "Shape Control of Tetrapod InP Nanocrystals", Nanomechatronics, University of Science and Technology, Aug. 2017, (pp. 1-49).*

(Continued)

*Primary Examiner* — C Melissa Koslow
(74) *Attorney, Agent, or Firm* — NSIP Law

(57) ABSTRACT

Tetrapod-shaped quantum dots having a tetrapod shape in which a core includes a plurality of arms, and each of the arms have a different growth degree depending on the crystal direction.

15 Claims, 11 Drawing Sheets

(51) Int. Cl.
*C09K 11/08* (2006.01)
*C09K 11/70* (2006.01)
*C09K 11/74* (2006.01)
*B82Y 20/00* (2011.01)
*B82Y 40/00* (2011.01)

(52) U.S. Cl.
CPC .......... *C09K 11/70* (2013.01); *C09K 11/7492* (2013.01); *B82Y 20/00* (2013.01); *B82Y 40/00* (2013.01); *C01P 2002/72* (2013.01); *C01P 2004/04* (2013.01); *C01P 2004/30* (2013.01); *C01P 2004/64* (2013.01)

(58) Field of Classification Search
CPC ..... B82Y 20/00; B82Y 40/00; C01P 2004/30; C01P 2004/64

See application file for complete search history.

(56) References Cited

U.S. PATENT DOCUMENTS

2019/0153317 A1* 5/2019 Kim .................. C09K 11/883
2021/0214611 A1* 7/2021 Bawendi ............ C09K 11/883

FOREIGN PATENT DOCUMENTS

| KR | 10-1811729 B1 | 12/2017 |
| KR | 10-2018-0075724 A | 7/2018 |
| KR | 10-1942304 B1 | 1/2019 |

OTHER PUBLICATIONS

Talapin, Dmitri V., et al. "Etching of Colloidal InP Nanocrystals with Fluorides: Photochemical Nature of the Process Resulting in High Photoluminescence Efficiency." *The Journal of Physical Chemistry B* vol. 106 Issue 49, Nov. 14, 2002 (pp. 12659-12663).

Xu, Shu et al. "Rapid synthesis of highly luminescent InP and InP/ZnS nanocrystals." *Journal of Materials Chemistry*, vol. 18 Issue 23 May 16, 2008: (pp. 2653-2656).

* cited by examiner

QUANTUM DOTS AND METHOD OF MANUFACTURING QUANTUM DOTS

CROSS-REFERENCE TO RELATED APPLICATIONS

Pursuant to 35 USC 120 and 365(c), this application is a continuation of International Application No. PCT/KR2020/005594 filed on Apr. 28, 2020, which claims the benefit under 35 USC 119(a) of Korean Patent Application No. 10-2019-0053735 filed on May 8, 2019 and Korean Patent Application No. 10-2020-0049760 filed on Apr. 24, 2020 in the Korean Intellectual Property Office, the entire disclosures of which are incorporated herein by reference for all purposes.

BACKGROUND

1. Field

The following description relates to quantum dots with improved luminescence properties and a manufacturing method thereof.

2. Description of the Related Art

Quantum dots (QDs), as semiconducting nano-sized particles having a three-dimensionally limited size, exhibit excellent optical and electrical properties that semiconducting materials do not have in a bulk state. For example, even if the quantum dots are made of the same material, the color of the emitting light may vary depending on the size of the particles. Due to these characteristics, the quantum dots are receiving attention as next-generation high brightness light emitting diodes (LEDs), biosensors, lasers, solar cell nano-materials, etc.

Although indium phosphide quantum dots are currently synthesized mainly using a precursor of tris(trimethylsilyl) phosphine (TMSP), there are economic/safety limitations due to the high price and intense reactivity of the TMSP precursor. Although an amino phosphine precursor is receiving attention as an inexpensive and stable precursor compared to the TMSP precursor, it is difficult to secure material competitiveness as there is a problem in that the luminescent full width at half maximum is wide compared to the indium phosphide quantum dots synthesized using the TMSP precursor.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a tetrapod-shaped quantum dot includes a core having a plurality of arms, and each of the arms has a different growth degree depending on a crystal direction.

The arms may have a plane perpendicular to the <110> crystal direction and a plane perpendicular to the <111> crystal direction.

The plane perpendicular to the <110> crystal direction may grow in the thickness direction of each of the arms, and the plane perpendicular to the <111> crystal direction may grow in the longitudinal direction of each of the arms.

The tetrapod-shaped quantum dot may have a full width at half maximum (FWHM) value of 35 to 45 nm at a wavelength of 600 to 690 nm.

The tetrapod-shaped quantum dot may include one or more of InP, InAs, InSb, and GaAs.

In another general aspect, a method of manufacturing a tetrapod-shaped quantum dot includes heating a first solution, the first solution including a first precursor mixed with a first solvent, mixing a second precursor, a second solvent, and a precursor activating material to form a second solution, synthesizing the tetrapod-shaped quantum dot by reacting the first solution with the second solution, and post-treating the tetrapod-shaped quantum dot.

The synthesizing the tetrapod-shaped quantum dot may include growing arms having a plane perpendicular to a <110> crystal direction and a plane perpendicular to a <111> crystal at different growth rates.

The method may include degassing the first solution before reacting the first solution with the second solution.

Synthesizing the tetrapod-shaped quantum dot may be performed at a temperature of 100 to 220° C.

Post-treating the tetrapod-shaped quantum dot may include one or both of etching the tetrapod-shaped quantum dot and shelling the tetrapod-shaped quantum dot.

Etching the tetrapod-shaped quantum dot may be performed by one or more of HF, $NOBF_4$, $C_4H_9OH$, and trioctylphosphine oxide.

The tetrapod-shaped quantum dot may be shelled by one or more of Zn, Cd, Se, and S.

The precursor activating material may include one or more of lithium bis(trimethylsilyl)amide (LiHMDS), lithium tetramethylpiperidide (LiTMP), lithium acetylacetonate (LiAcac), lithium-2,2,6,6-tetramethyl-3,5-heptanedionate (LiTMHD), and diisobutylaluminum hydride (DIBALH).

The first precursor may include one or more of $InCl_2$, InO, CdO, $In(CH_3CO_2)_3$, $Cd(CH_3CO_2)_2$, $CdCl_2$, $Ga(C_2H_3O_2)_3$, $Ga_2O_3$, and $GaCl_3$.

The first solvent and the second solvent may each include one or more of oleylamine, dodecylamine, hexadecylamine, octadecylamine, octylamine, and trioctylamine.

The second precursor may include one or more of tris(dimethylamino)phosphine (DMAP), tris(diethylamino)phosphine (DEAP), sulfur-trioctylphosphine (S-TOP), sulfur-tributylphosphine (S-TBP), sulfur-triphenylphosphine (S-TPP), sulfur-trioctylamine (S-TOA), diethyl diselenide, dimethyl selenide, selenium-triphenylphosphine (Se-TPP), tris(dimethylamino)arsine, tris(diethylamino)arsine, tris(dimethylamino)antimony, $AsCl_3$, $AsBr_3$, $As_2S_3$, $As_2O_3$, $AsI_3$, and tris(diethylamino)antimony.

In another general aspect, an electronic device includes a plurality of tetrapod-shaped quantum dots, and each of the tetrapod-shaped quantum dots includes a core including of arms, each of the arms having a different growth degree depending on a crystal direction.

Other features and aspects will be apparent from the following detailed description, the drawings, and the claims.

Figure 7:
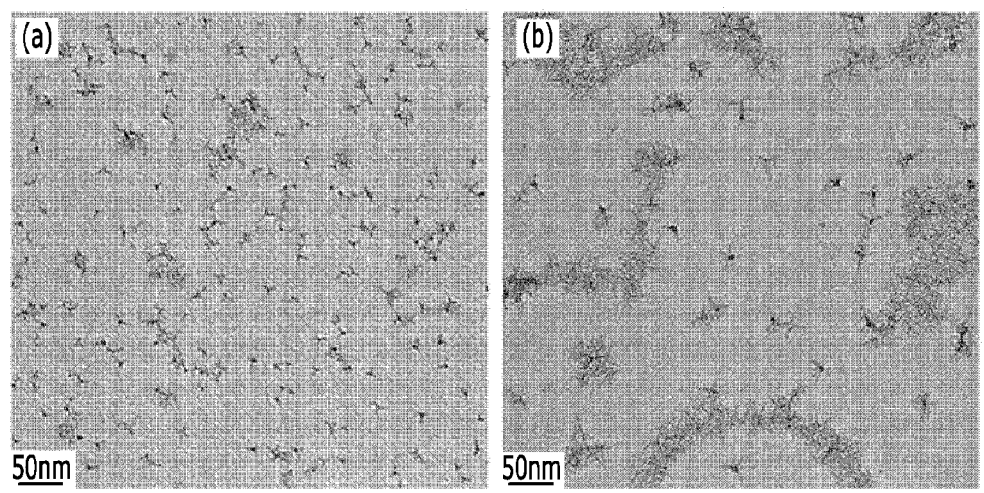

(a) and (b) of FIG. 7 are TEM images of quantum dots according to an example.

Figure 8:
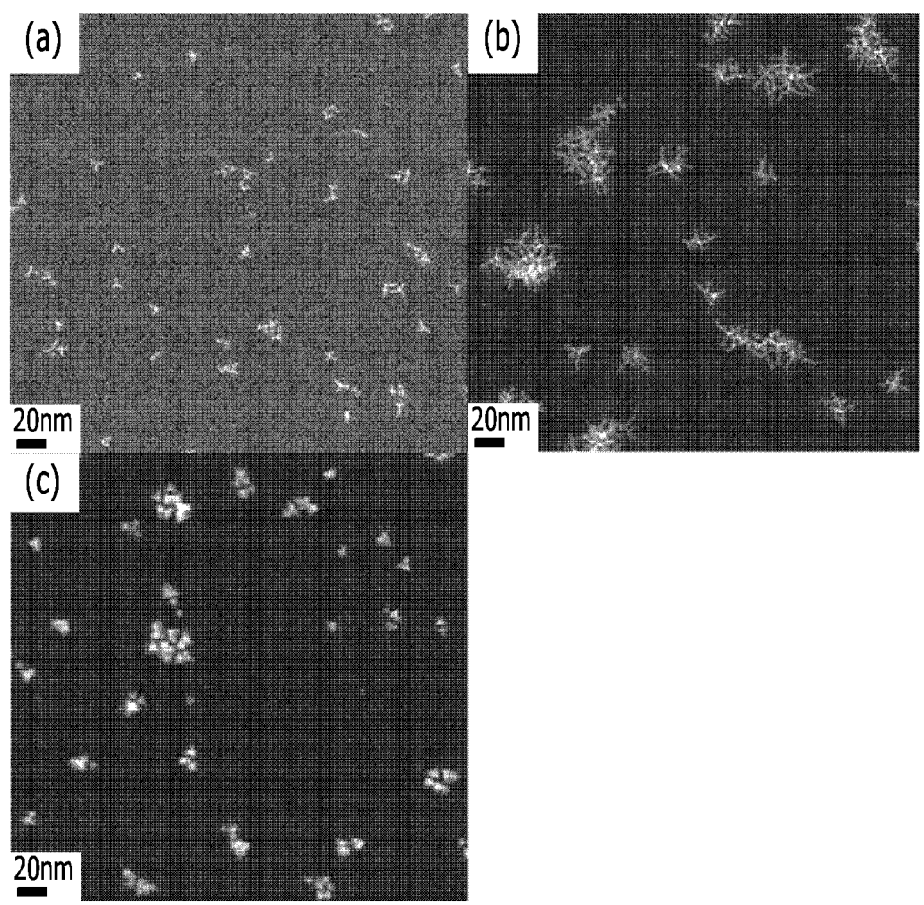

(a) of FIG. 8 is a TEM image of quantum dots according to one example, (b) of FIG. 8 is a TEM image of quantum dots according to another example, and (c) of FIG. 8 is a TEM image of quantum dots according to a comparative example.

Figure 9:
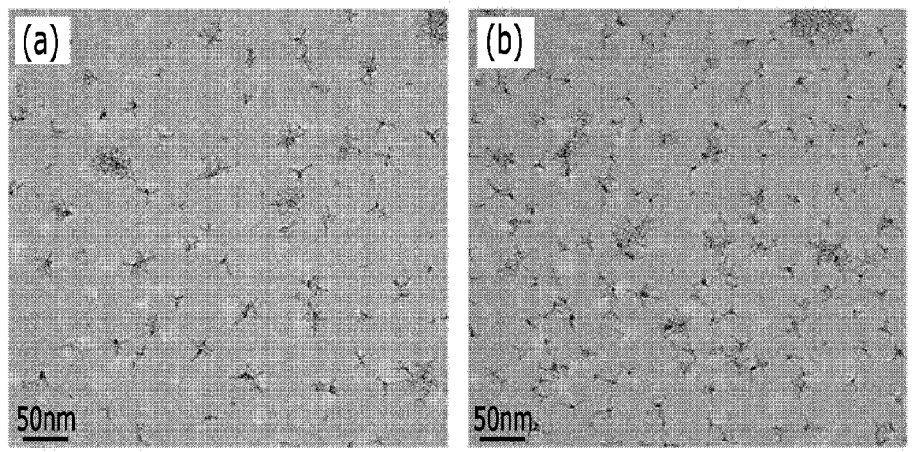

(a) of FIG. 9 is a TEM image of quantum dots according to one example, and (b) of FIG. 9 is a TEM image of quantum dots according to another example.

Figure 10:
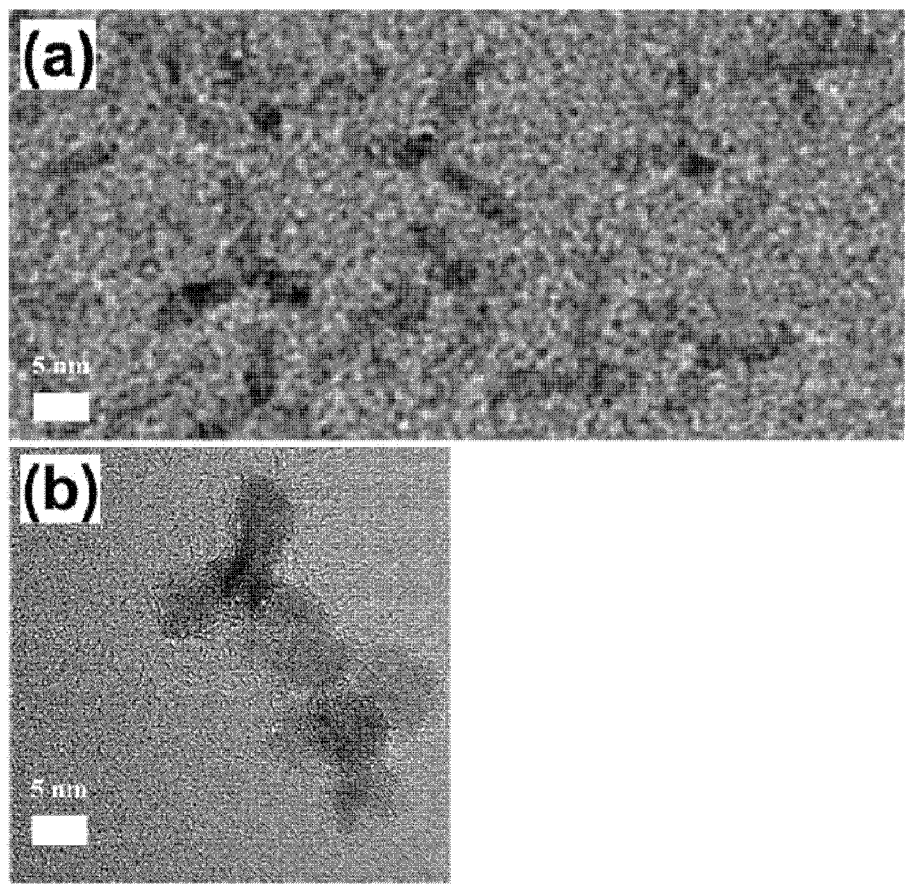

FIG. 10 is TEM images of quantum dots according to an example.

Figure 11:
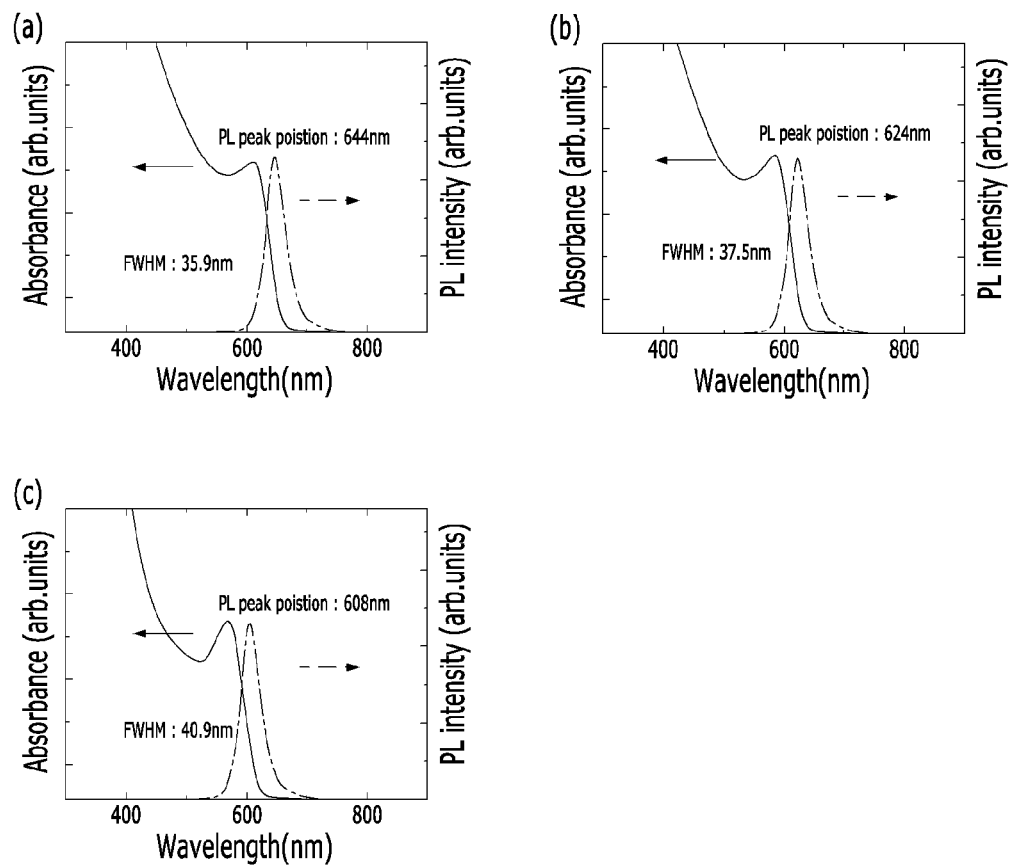

FIG. 11 illustrates graphs for luminescent full widths at half maximum of quantum dots according to an example. Specifically, (a) to (c) of FIG. 11 illustrate graphs for the luminescent full widths at half maximum of the quantum dots treated with hydrofluoric acid after changing the amounts of $(Me_2N)_3P$ and D-OLA injected.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Hereinafter, quantum dots with improved luminescence properties according to various examples and a manufacturing method thereof will be described in detail with reference to examples and drawings. However, the present application is not limited to such examples and drawings.

Provided are tetrapod-shaped quantum dots having a tetrapod shape including a plurality of arms, in which each of the plurality of arms has a different growth degree depending on the crystal direction.

Quantum dots according to the various examples refer to zero-dimensional semiconductor nanoparticles, and the quantum dots have been known to have optical and electrical properties different from those of a conventional bulk material since the size of the material is very small in nm units so that the band composed of continuous energy states changes discontinuously.

These quantum dots have various forms such as a core/shell structure including a core and a shell besieging and surrounding the core, an alloy quantum dot with a composition of a part of the quantum dot, a doped quantum dot doped with something in the quantum dot, etc., and the various examples provide tetrapod-shaped quantum dots including a core composed of an inorganic material or an organic material, and arms grown from the core.

In this regard, tetrapod-shaped quantum dots according to the various examples are a combination of a metal cation and a non-metal anion.

Figure 1:
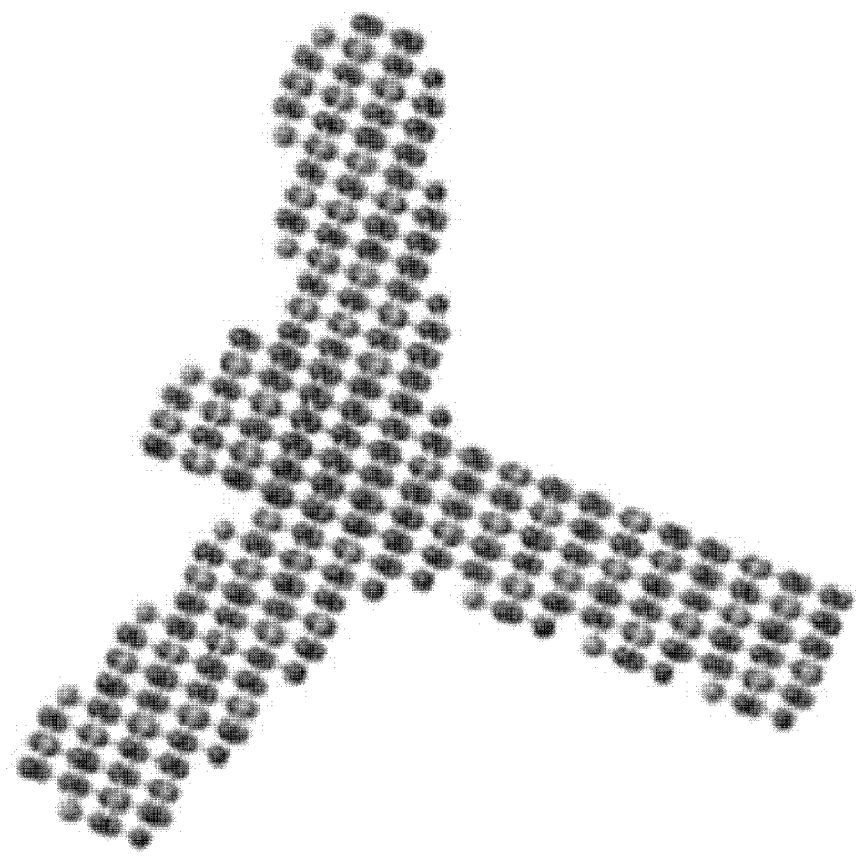
FIG. 1 is a schematic diagram of tetrapod-shaped quantum dots according to an example.

FIG. 1 is a schematic diagram of tetrapod-shaped quantum dots according to an example.

According to an example, although the plurality of arms may grow from the core, the configuration is not limited thereto. For example, although the tetrapod-shaped quantum dots may include a core and a plurality of arms grown from the core, the configuration is not limited thereto.

According to an example, although a crystal plane having each of the plurality of arms included therein may have a different growth degree depending on the crystal direction, the configuration is not limited thereto.

According to an example, although the arms may be grown to have a plane perpendicular to the <110> crystal direction and the plane perpendicular to the <111> crystal direction, the configuration is not limited thereto.

The description of the <110> or <111> crystal direction is indicated by a Miller index. The Miller index according to the various examples is an index for indicating a crystal direction ([uvw]) or a crystal plane ((hkl)). If sizes of lattice constants a, b, and c of a crystal are the same, and angles formed by an a-axis, a b-axis, and a c-axis of the crystal are the same as 90°, a <uvw> crystal direction group means a set of crystal directions selected from the group consisting of [uvw], [uv-w], [u-vw], [u-v-w], [-uvw], [-uv-w], [-u-vw], [-u-v-w], and combinations thereof, and the <uvw> crystal direction group may be the same as <uwv>, <vuw>, <vwu>, <wuv>, and <wvu> crystal direction groups.

Further, a {hkl} crystal plane group refers to a set of crystal planes selected from the group consisting of (hkl), (hk-l), (h-kl), (h-k-l), (-hkl), (-hk-l), (-h-kl), (-h-k-l), and combinations thereof, and the {hkl} crystal plane group may be the same as {hlk}, {khl}, {klh}, {lhk}, and {lkh} crystal plane groups. Further, if u=h, v=k, and w=l are established in [uvw] and (hkl), the (hkl) plane means to be perpendicular to the [uvw] direction.

For example, the plane perpendicular to the <110> crystal direction may include planes perpendicular to the [110], [101], or [011] crystal direction, i.e., (110), (101), (011), (-1, 1, 0), (-1, 0, 1), (0, -1, 1), (1, -1, 0), (1, 0, -1), and (0, 1, -1) planes.

In this regard, unless otherwise stated, the description of (h,k,l) or [u,v,w] refers to a Miller index (uvw) of the crystal plane or a Miller index [uvw] of the crystal direction.

According to an example, the arms may include a {110} plane and a {111} plane at the same time.

According to an example, although the plane perpendicular to the <110> crystal direction may grow in the thickness direction of each of the arms, and the plane perpendicular to the <111> crystal direction may grow in the longitudinal direction of each of the arms, the configuration is not limited thereto.

Specifically, the tetrapod-shaped quantum dots may have four arms. At this time, although the plane perpendicular to the <110> crystal direction may grow in the thickness direction of the arm, and the plane perpendicular to the <111> crystal direction may grow in the longitudinal direction of the arm in one of the arms of the tetrapod-shaped quantum dots, the configuration is not limited thereto.

According to an example, although the arms may have the same length and thickness, the configuration is not limited thereto. The plurality of arms grown from the core may have the same length and thickness, and the length and thickness of the arms may be different depending on the growth degree of the plane perpendicular to the <110> crystal direction of the arms and the growth degree of the plane perpendicular to the <111> crystal direction of the arms.

According to an example, although one of the arms may have a thickness of 1 to 4 nm and a length of 4 to 20 nm, the configuration is not limited thereto.

For example, the arm may include a {110} plane and a {111} plane. At this time, the arm grows in the {110} plane direction so that the arm may have a thickness of about 1 to 4 nm, about 2 to 4 nm, about 3 to 4 nm, about 1 to 2 nm, about 1 to 3 nm, or about 2 to 3 nm.

Further, although the arm grows in the {111} plane direction so that the arm may have a length of about 4 to 20 nm, about 5 to 20 nm, about 6 to 20 nm, about 7 to 20 nm, about 8 to 20 nm, about 9 to 20 nm, about 10 to 20 nm, about 12 to 20 nm, about 14 to 20 nm, about 16 to 20 nm, about 18 to 20 nm, about 4 to 5 nm, about 4 to 6 nm, about 4 to 7 nm, about 4 to 8 nm, about 4 to 9 nm, about 4 to 10 nm, about 4 to 12 nm, about 4 to 14 nm, about 4 to 16 nm, about 4 to 18 nm, about 5 to 18 nm, about 6 to 16 nm, about 7 to 14 nm, about 8 to 12 nm, or about 9 to 10 nm, the configuration is not limited thereto.

According to an example, although the quantum dots may be tetrapod-shaped single crystalline quantum dots, the configuration is not limited thereto.

As will be described later, the arms of the tetrapod-shaped quantum dots are grown at a predetermined angle with the core, and the quantum dots may be grown in a tetrahedral shape when the growth conditions are changed.

According to an example, although the tetrapod-shaped quantum dots may not include a dangling bond on the surface of the arm, and/or may include a shell on the surface of the tetrapod-shaped quantum dots, the configuration is not limited thereto.

As will be described later, the tetrapod-shaped quantum dots may have an emission spectrum by not including a dangling bond and/or including a shell on the surface thereof.

According to an example, although the quantum dots may have an emission spectrum of 400 to 700 nm, the configuration is not limited thereto.

According to an example, although the quantum dots may have a full width at half maximum value of 35 to 45 nm at a wavelength of 600 to 690 nm, the configuration is not limited thereto.

The full width at half maximum according to the various examples refers to a width of the wavelength of light at a point where the intensity of the light is half based on a point (peak position) where the intensity of light emitted by the quantum dots is the highest.

Since the quantum dots have a high luminescence intensity at a specific wavelength, the quantum dots may emit light when electrons and holes or energy are supplied to the quantum dots.

According to an example, although the tetrapod-shaped quantum dots may have a Stokes shift of 0.1 to 0.2 eV, the configuration is not limited thereto. For example, although the quantum dots may have a Stokes shift of about 0.1 to 0.2 eV, about 0.11 to 0.2 eV, about 0.12 to 0.2 eV, about 0.13 to 0.2 eV, about 0.14 to 0.2 eV, about 0.15 to 0.2 eV, about 0.16 to 0.2 eV, about 0.17 to 0.2 eV, about 0.18 to 0.2 eV, about 0.19 to 0.2 eV, about 0.1 to 0.11 eV, about 0.1 to 0.12 eV, about 0.1 to 0.13 eV, about 0.1 to 0.14 eV, about 0.1 to 0.15 eV, about 0.1 to 0.16 eV, about 0.1 to 0.17 eV, about 0.1 to 0.18 eV, about 0.1 to 0.19 eV, about 0.11 to 0.19 eV, about 0.12 to 0.18 eV, about 0.13 to 0.17 eV, about 0.14 to 0.16 eV, or about 0.15 eV, the configuration is not limited thereto.

As will be described later, although tetrapod-shaped quantum dots may emit light in red by the Stokes shift and the peak position, the configuration is not limited thereto. For example, the etching means, the etching time, or the shelling material is changed so that the tetrapod-shaped quantum dots may emit light in various colors, and the luminescence intensity may be changed.

According to an example, although the tetrapod-shaped quantum dots may include one selected from the group consisting of InP, InAs, InSb, GaAs, CdSe, CdS, and combinations thereof, the configuration is not limited thereto.

Furthermore, provided is a manufacturing method of tetrapod-shaped quantum dots, including the steps of heating a first solution in which a first precursor and a first solvent are mixed, mixing a second precursor, a second solvent, and a precursor activating material to form a second solution, synthesizing tetrapod-shaped quantum dots by reacting the first solution and the second solution, and post-treating the tetrapod-shaped quantum dots.

With respect to the manufacturing method of the tetrapod-shaped quantum dots, although detailed descriptions of parts overlapping with the various examples have been omitted, the contents described in the various examples may be equally applied.

Figure 2:
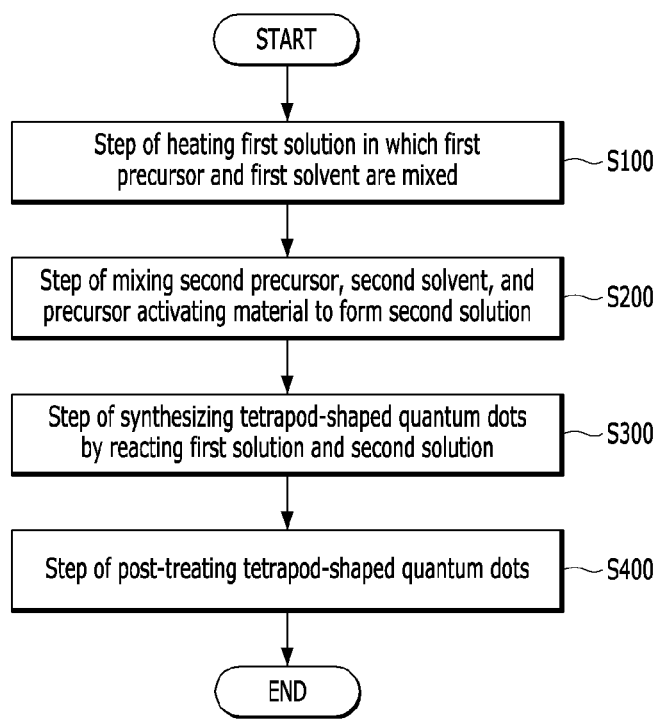
FIG. 2 is a flowchart of a manufacturing method of quantum dots according to an example.

FIG. 2 is a flowchart of a manufacturing method of quantum dots according to an example.

Although indium phosphide quantum dots of the related art are synthesized mainly using a tris(trimethylsilyl)phosphine (TMSP) precursor, there are economic/safety limitations due to the high price and intense reactivity of the TMSP precursor. Although an amino phosphine precursor is receiving attention as an inexpensive and stable precursor compared to the TMSP precursor, it is difficult to secure material competitiveness as there is a problem in that the luminescent full width at half maximum is wide compared to the indium phosphide quantum dots synthesized using the TMSP precursor.

In order to recognize these problems and solve them, the disclosed manufacturing method of quantum dots is provided, wherein the manufacturing method synthesizes tetrapod-shaped quantum dots by adjusting the nucleation process of quantum dots and controlling the growth direction by using a precursor activating material. The quantum dots manufactured according to the manufacturing method may improve cost reduction in the QD-LED display market and luminescence properties by having superior optical properties (narrow luminescent full width at half maximum, high luminous efficiency, etc.) than quantum dots synthesized using the tris(trimethylsilyl)phosphine (TMSP) precursor.

First, the first solution in which the first precursor and the first solvent are mixed is heated (S100).

According to an example, although the first precursor may include one selected from the group consisting of $InCl_2$, InO, CdO, $In(CH_3CO_2)_3$, $Cd(CH_3CO_2)_2$, $CdCl_2$, $Ga(C_2H_3O_2)_3$, $Ga_2O_3$, $GaCl_3$, and combinations thereof, the method is not limited thereto.

According to an example, although the first solution may be heated to have a temperature of 120 to 160° C., the method is not limited thereto. For example, although the first solution may be heated to have a temperature of about 120 to 160° C., about 130 to 160° C., about 140 to 160° C., about 150 to 160° C., about 120 to 130° C., about 120 to 140° C., about 120 to 150° C. about 130 to 150° C., or about 140° C., the method is not limited thereto.

In this regard, although the first solution may be heated while mixing the first precursor and the first solvent, the method is not limited thereto.

Subsequently, a second solution is formed by mixing the second precursor, the second solvent, and the precursor activating material (S200).

According to an example, although the first solvent and the second solvent may each independently include one selected from the group consisting of oleylamine, dodecylamine, hexadecylamine, octadecylamine, octylamine, trioctylamine, and combinations thereof, the method is not limited thereto.

According to an example, although the second precursor may include one selected from the group consisting of tris(dimethylamino)phosphine (DMAP), tris(diethylamino)phosphine (DEAP), sulfur-trioctylphosphine (S-TOP), sulfur-tributylphosphine (S-TBP), sulfur-triphenylphosphine (S-TPP), sulfur-trioctylamine (S-TOA), diethyl diselenide, dimethyl selenide, selenium-triphenylphosphine (Se-TPP), tris(dimethylamino)arsine, tris(diethylamino)arsine, tris(dimethylamino)antimony, $AsCl_3$, $AsBr_3$, $As_2S_3$, $As_2O_3$, $AsI_3$, tris(diethylamino)antimony, and combinations thereof, the method is not limited thereto.

According to an example, although the precursor activating material may include a material selected from the group consisting of lithium bis(trimethylsilyl)amide (LiHMDS), lithium tetramethylpiperidide (LiTMP), lithium acetylacetonate (LiAcac), lithium-2,2,6,6-tetramethyl-3,5-heptanedionate (LiTMHD), diisobutylaluminum hydride (DIBALH), and combinations thereof, the method is not limited thereto.

The precursor activating material refers to a material for forming the core of the quantum dots by accelerating the reaction of the first precursor and the second precursor, thereby instantaneously exhausting the precursor. The process of synthesizing tetrapod-shaped quantum dots may be clearly separated into the process of forming a core and the process of growing arms from the core by the precursor activating material.

According to an example, although the step of forming the first solution and the step of forming the second solution may include forming the second solution after forming the first solution, forming the first solution after forming the second solution, or forming the first solution and the second solution at the same time, the method is not limited thereto.

Subsequently, tetrapod-shaped quantum dots are synthesized by reacting the first solution with the second solution (S300).

In general, since an isotropic shape has a lower energy than an anisotropic shape, the material may be synthesized to have an isotropic shape when synthesizing a material in the macroscopic world.

However, since the anisotropic shape may have low energy compared to the isotropic shape when the size of a material such as quantum dots is very small, the material may have an anisotropic shape when synthesizing the material in the nano world.

When the precursor activating material is not present in the process of synthesizing the quantum dots, the first precursor and the second precursor may slowly react to form tetrahedral-shaped quantum dots.

Since the tetrahedral-shaped quantum dots have a large particle size compared to tetrapod-shaped quantum dots according to the present disclosure, the effect by the quantum confinement effect is small so that the tetrahedral-shaped quantum dots may have a small energy band gap. However, since the tetrapod-shaped quantum dots receive a greater quantum confinement effect in the arm thickness direction than in the arm longitudinal direction, the tetrapod-shaped quantum dots may have a relatively large energy band gap even if the tetrahedral-shaped quantum dots and the tetrapod-shaped quantum dots have the same volume.

According to an example, although the step of degassing the first solution before reacting the first solution with the second solution may be further included, the method is not limited thereto. For example, although, after performing the step of synthesizing the first solution, the step of degassing the first solution may be performed before or after performing the step of heating the first solution, or before performing the step of reacting the first solution with the second solution, the method is not limited thereto.

The degassing means depressurizing the pressure inside the glove box in which the first solution is positioned to less than about 10 Torr, less than about 9 Torr, less than about 8 Torr, less than about 7 Torr, less than about 6 Torr, less than about 5 Torr, less than about 4 Torr, less than about 3 Torr, less than about 2 Torr, or less than about 1 Torr.

According to an example, although the step of synthesizing the tetrapod-shaped quantum dots may be performed at a temperature of 100 to 220° C., the method is not limited thereto. For example, although the step of synthesizing the tetrapod-shaped quantum dots may be performed at a temperature of about 100 to 220° C., about 110 to 220° C., about 120 to 220° C., about 130 to 220° C., about 140 to 220° C., about 150 to 220° C., about 160 to 220° C., about 170 to 220° C., about 180 to 220° C., about 190 to 220° C., about 200 to 220° C., about 210 to 220° C., about 100 to 110° C., about 100 to 120° C., about 100 to 130° C., about 100 to 140° C., about 100 to 150° C., about 100 to 160° C., about 100 to 170° C., about 100 to 180° C., about 100 to 190° C., about 100 to 200° C., about 100 to 210° C., about 110 to 210° C., about 120 to 200° C., about 130 to 190° C., about 140 to 180° C., about 150 to 170° C., or about 160° C., the method is not limited thereto.

According to an example, although the step of synthesizing the tetrapod-shaped quantum dots may include the steps of forming a core of the quantum dots by reacting the precursor activating material, the first solution, and the second solution, and growing a crystal plane in an arbitrary crystal direction including the {110} and {111} plane directions from the core, the method is not limited thereto.

The tetrapod-shaped quantum dots may be formed by reacting the first solution and the second solution. In this regard, when a precursor is additionally present in the mixed solution of the first solution and the second solution, the shape of the tetrapod-shaped quantum dots may be changed by adjusting the reaction temperature.

For example, when the tetrapod-shaped quantum dots are reacted in the mixed solution of 100 to 220° C., the plane perpendicular to the <110> crystal direction grows in the thickness direction of the arm, and the plane perpendicular to the <111> crystal direction grows in the longitudinal direction of the arm in the tetrapod-shaped quantum dots so that the physical properties of the tetrapod-shaped quantum dots may be adjusted.

As will be described later, the tetrapod-shaped quantum dots formed by the reaction of the first solution and the second solution may not have an emission spectrum.

However, since the arms of the tetrapod-shaped quantum dots grow at the same rate in all crystal directions when reacting the tetrapod-shaped quantum dots in a mixed solution exceeding 220° C., the tetrapod-shaped quantum dots may be converted into tetrahedral-shaped quantum dots.

According to an example, although the plane perpendicular to the <110> crystal direction and the plane perpendicular to the <111> crystal direction of the arms may be grown at different growth rates in the step of synthesizing the tetrapod-shaped quantum dots, the method is not limited thereto.

In this regard, atomic composition ratios of the arm having the plane perpendicular to the <110> crystal direction and the arm having the plane perpendicular to the <111> crystal direction may be different.

For example, when the tetrapod-shaped quantum dots are InP, although the number of moles of In and the number of moles of P in the plane perpendicular to the <110> crystal direction may be 1:1 to 1.1:1, and the number of moles of In and the number of moles of P in the plane perpendicular to the <111> crystal direction may be 1.15:1 to 1.25:1, the various examples are not limited thereto.

Subsequently, the tetrapod-shaped quantum dots are post-treated (S400).

According to an example, although the step of separating the quantum dots before performing the step of post-treating the tetrapod-shaped quantum dots may be further included, the method is not limited thereto.

Since the tetrapod-shaped quantum dots exist in a synthesized state inside the mixed solution of the first solution and the second solution, it is necessary to separate the mixed solution and the tetrapod-shaped quantum dots in order to post-treat the tetrapod-shaped quantum dots.

According to an example, although the step of separating the tetrapod-shaped quantum dots may be performed by a process selected from the group consisting of precipitation separation, centrifugation, pressure filtration, reduced pressure filtration, heating evaporation, and combinations thereof, the method is not limited thereto.

According to an example, although the step of post-treating the tetrapod-shaped quantum dots may include the steps of etching the tetrapod-shaped quantum dots, and/or shelling the tetrapod-shaped quantum dots, the method is not limited thereto.

Although the physical shape of the tetrapod-shaped quantum dots is maintained when post-treating the tetrapod-shaped quantum dots, the Stokes shift of the tetrapod-shaped quantum dots may be changed by changing the electronic structure of the tetrapod-shaped quantum dots.

In this regard, since quantum dots that have not undergone the post-treatment step include surface defects such as a dangling bond, an emission spectrum may not exist. However, the tetrapod-shaped quantum dots that have undergone the post-treatment step allow etching to remove a dangling bond on the surface thereof, or are shelled by another material so that they may emit light unlike the quantum dots that have not undergone the post-treatment step, and this means that the tetrapod-shaped quantum dots that have undergone the post-treatment step have a Stokes shift.

Stokes shift according to the various examples refers to a difference between a wavelength value when a spectrum (absorption spectrum) when any material absorbs light has the highest intensity, and a wavelength value when a spectrum (emission spectrum) when the material emits light has the highest intensity. The smaller the Stokes shift of any material, the less energy loss in absorption and emission.

According to an example, although the step of etching the tetrapod-shaped quantum dots may be performed by one selected from the group consisting of HF, $C_4H_9OH$, trioctylphosphine oxide, and combinations thereof, the method is not limited thereto.

The wavelength and/or intensity of light emitted by the tetrapod-shaped quantum dots that have undergone the post-treatment step may vary depending on the time of the etching process or the material to be etched.

According to an example, although the tetrapod-shaped quantum dots may be shelled by one selected from the group consisting of Zn, Cd, Se, S, and combinations thereof, the application method is not limited thereto.

Although the tetrapod-shaped quantum dots separated from the mixed solution may be shelled in a third solution including one selected from the group consisting of Zn, Cd, Se, S, and combinations thereof, the method is not limited thereto.

According to an example, although the third solution may further include one selected from the group consisting of $F^-$, $Cl^-$, $Br^-$, $I^-$, carboxylate group, amide group, trioctylphosphine, dodecanethiol, Bis(trimethylsilyl)sulfide, and combinations thereof, the method is not limited thereto.

For example, after separating the tetrapod-shaped quantum dots obtained as a result of the reaction of the first solution and the second solution from the mixed solution of the first solution and the second solution, the tetrapod-shaped quantum dots are dispersed in a third solution containing a Zn precursor including Zn amide or Zn carboxylate, and a TOP-Se precursor is slowly injected into the third solution so that the tetrapod-shaped quantum dots may be shelled by ZnSe.

Although the tetrapod-shaped quantum dots shelled by ZnSe may emit red light, the shelled tetrapod-shaped quantum dots may emit light in a color other than red, or the wavelength of the emitted light may become intense when converting the Zn precursor of the third solution to a Cd precursor and converting the Se precursor to S or a halogen element.

According to an example, although the shelling temperature may be 200 to 300° C., the method is not limited thereto.

For example, although the shelling temperature may be about 200 to 300° C., about 210 to 300° C., about 220 to 300° C., about 230 to 300° C., about 240 to 300° C., about 250° C. to 300° C., about 260 to 300° C., about 270 to 300° C., about 280 to 300° C., about 290 to 300° C., about 200 to 210° C., about 200 to 220° C., about 200 to 230° C., about 200 to 240° C., about 200 to 250° C., about 200 to 260° C., about 200 to 270° C., about 200 to 280° C., about 200 to 290° C., about 210 to 290° C., about 220 to 280° C., about 230 to 270° C., about 240 to 260° C., or about 250° C., the method is not limited thereto.

The tetrapod-shaped quantum dots are post-treated so that the dangling bond on the surface of the tetrapod-shaped quantum dots may be removed, or the surface is shelled by another material so that the tetrapod-shaped quantum dots may have improved luminous efficiency compared to the conventional tetrahedral-shaped quantum dots.

Although the various examples will be described in more detail through the following examples, the following examples are for illustrative purposes only and are not intended to limit the scope of the present disclosure.

[Example 1]: InP Tetrapod-Shaped Quantum Dots 1

After mixing 1.2 g (5 mmol) of $InCl_3$ and 25 ml of oleylamine to prepare an In precursor solution, the In precursor solution was degassed at 120 to 140° C. in a vacuum state of 1 Torr for 2 hours. Subsequently, the solution was injected into a nitrogen atmosphere. Subsequently, after mixing 0.18 mL (1 mmol) of $(Me_2N)_3P$, 0.016 g (0.1 mmol) of lithium bis(trimethylsilyl)amide (LiHMDS), and 0.5 ml of degassed oleylamine (D-OLA) to prepare a P precursor solution, the In precursor solution was quickly injected into the P precursor solution at 160 to 190° C. After mixing the two solutions, the reaction temperature was maintained for 60 minutes.

In this regard, when Cl is not present in the process of forming the quantum dots according to Example 1 above, a cation and an anion may be bound to the (110) plane of the quantum dots so that the (110) plane of the quantum dots has a low surface energy due to a stoichiometric composition. However, when Cl and MA are present, the (111) plane is stabilized by Cl and Cl/MA passivation, whereas the (−1, −1, −1) plane may have a high surface energy even with InCl passivation.

The surface energy according to the direction of a crystal plane during the InP synthesis process and the surface energy when the ligand is attached to the crystal plane are calculated by density function theory (DFT) in Tables 1 and 2 below.

TABLE 1

| Direction of surface crystal plane | Surface energy (meV/Å²) |
|---|---|
| (100) | 85.1 |
| (110) | 36.6 |
| (111) | 72.3 |
| (−1, −1, −1) | 73.4 |

TABLE 2

| Direction of surface crystal plane | Ligand | Surface energy (meV/Å²) |
|---|---|---|
| (111) | 3Cl, MA(2 × 2) | −75.7 |
|  | Cl(1 × 1) | −58.7 |
| (−1, −1, −1) | InCl(1 × 1) | 165.9 |

Referring to Tables 1 and 2, it can be seen that the (−1, −1, −1) crystal plane is unstable compared to the (111) crystal plane and the {110} crystal plane.

Figure 3:
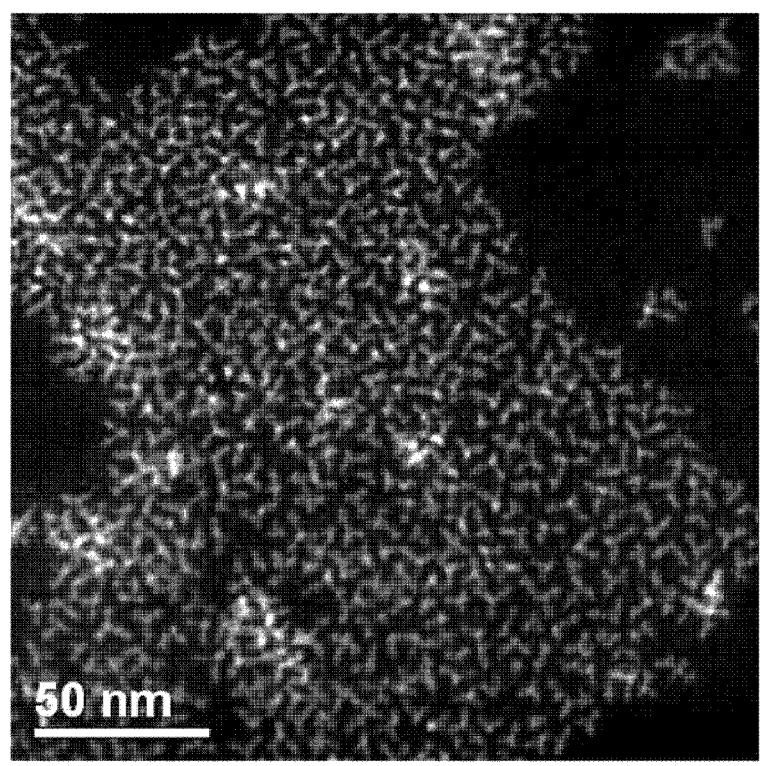
FIG. 3 is one transmission electron microscope (TEM) image of tetrapod-shaped quantum dots according to an example.

FIG. 3 is a TEM image of tetrapod-shaped quantum dots according to the above Example 1.

Referring to FIG. 3, it can be seen that the quantum dots have a zinc-blende structure and have a tetrapod shape as a whole.

[Example 2]: InP Tetrapod-Shaped Quantum Dots 2

Tetrapod-shaped InP quantum dots were synthesized in the same manner as in Example 1 by using 0.1 mmol of diisobutylaluminium hydride (DIBAL-H) instead of 0.1 mmol of LiHMDS.

[Example 3]: InAs Tetrapod-Shaped Quantum Dots

After mixing 1.2 g (5 mmol) of $InCl_3$ and 25 ml of oleylamine to prepare an In precursor solution, the In precursor solution was degassed at 120 to 140° C. in a vacuum state of 1 Torr for 2 hours. Subsequently, after mixing 0.092 mL (0.5 mmol) of $(Me_2N)_3AS$, 0.016 g (0.1 mmol) of lithium bis(trimethylsilyl)amide (LiHMDS), and 0.5 ml of D-OLA to prepare an As precursor solution, the solution was stirred at 40° C. for 10 minutes.

Subsequently, after rapidly injecting the In precursor solution into the As precursor solution at a temperature of more than 220° C. and not more than 280° C., and reacting the In precursor solution and the As precursor solution for 1 hour to obtain a reaction product, the reaction product was cooled to room temperature.

Figure 4:
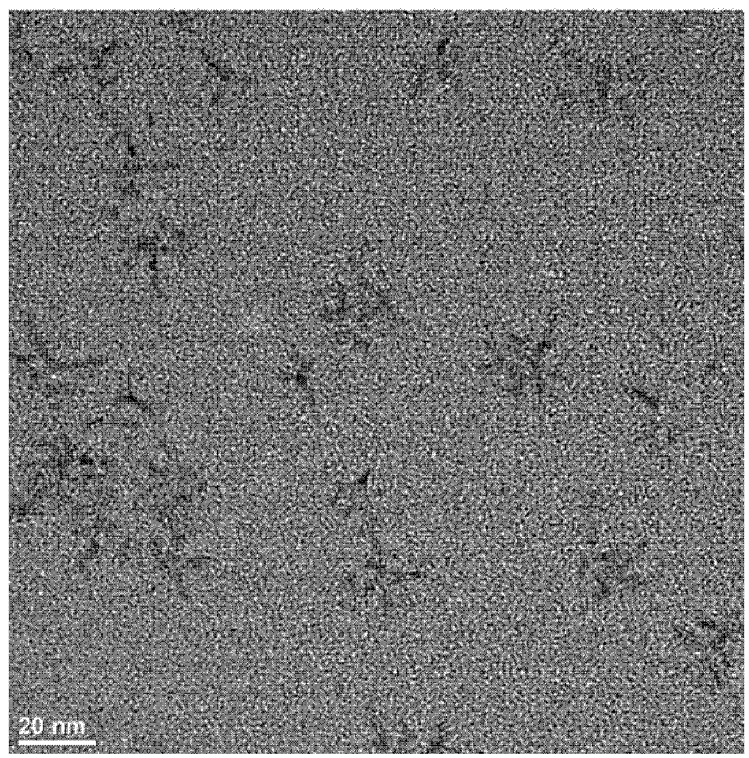
FIG. 4 is another TEM image of tetrapod-shaped quantum dots according to an example.

FIG. 4 is a TEM image of tetrapod-shaped quantum dots according to the above Example 3.

[Example 4]: InP Tetrapod-Shaped Quantum Dots 3

After mixing 1.2 g (5 mmol) of $InCl_3$ and 25 ml of oleylamine to prepare an In precursor solution, the In precursor solution was degassed at 120 to 140° C. in a vacuum state of 1 Torr for 2 hours. Subsequently, after mixing 0.09 mL (0.5 mmol) of $(Me_2N)_3P$, 0.008 g (0.05 mmol) of lithium bis(trimethylsilyl)amide (LiHMDS), and 0.5 ml of D-OLA to prepare a P precursor solution, the P precursor solution was rapidly injected into the In precursor solution at 180 to 190° C. After mixing the two solutions, the reaction temperature was maintained for 30 minutes.

Subsequently, after cooling the mixed solution to 170° C., 0.24 ml of $(Me_2N)_3P$ and 1.76 ml of D-OLA solution were slowly injected into the cooled mixed solution at a rate of 0.02 ml per minute for 2 hours, and when the injection was completed, the temperature was raised to 270° C. within 10 minutes, and then the reaction was terminated.

In this regard, the amounts of $(Me_2N)_3P$ and D-OLA injected may be changed depending on experiments.

Figure 5:
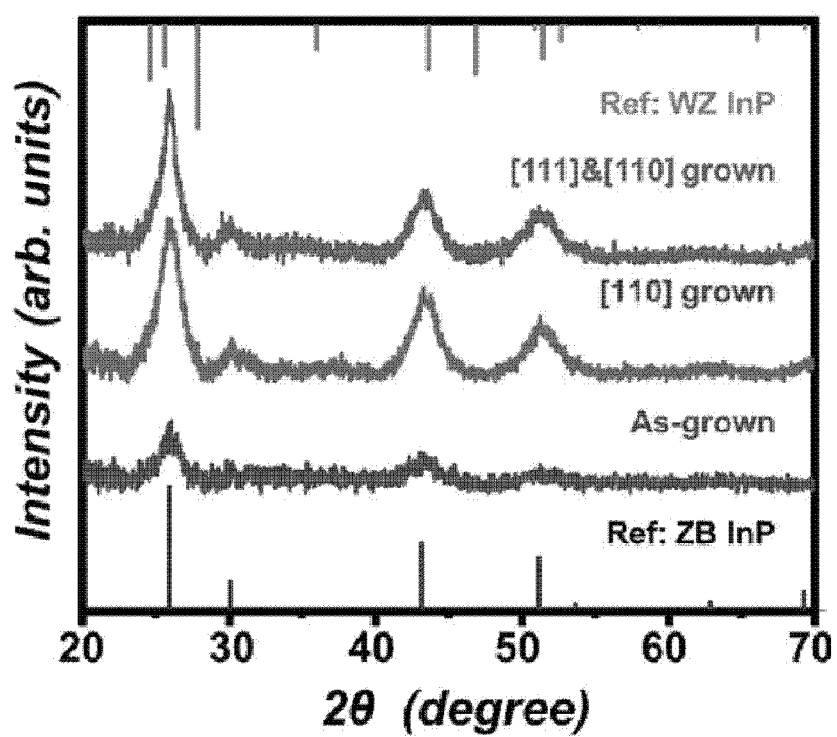
FIG. 5 is an X-ray diffraction (XRD) pattern of tetrapod-shaped quantum dots according to an example.

FIG. 5 is an XRD pattern of tetrapod-shaped quantum dots according to the above Example 4. Specifically, as-grown means tetrapod-shaped quantum dots separated after synthesis, and grown means tetrapod-shaped quantum dots grown in the corresponding direction.

Referring to FIG. 5, it can be seen that the quantum dots according to the above Example 4 have a ZB (Zinc blende) structure rather than a WZ (wurzite) structure, and the ZB structure becomes more distinct as they grow in the [111] and [110] directions.

[Example 5]: InP Tetrapod-Shaped Quantum Dots Treated with Hydrofluoric Acid

A dilute hydrofluoric acid solution was prepared by mixing 5 ml of butanol, 0.565 ml of an aqueous HF solution having a concentration of 48 wt %, and 0.065 ml of deionized water. Subsequently, after tetrapod-shaped InP of Example 4 above was washed with 7 ml of hexane, 5 ml of butanol, and 0.05 g of TOPO solution, and reacted with 0.3 ml of the dilute hydrofluoric acid solution for 10 minutes to obtain a reaction-terminated InP, the reaction-terminated InP was washed with butanol.

[Example 6]: Quantum Dots Shelled by ZnSe

After mixing 0.68 g of $ZnCl_2$ and 10 ml of oleylamine at 90° C. to obtain a mixed solution, the mixed solution was degassed at 1 Torr or less for 1 hour, and then converted to an N2 atmosphere. Subsequently, after adding 0.1 g of the tetrapod-shaped InP of Example 4 above to the degassed mixed solution of $ZnCl_2$ and oleylamine, a ZnSe shell was formed on the surface of the InP by injecting a solution prepared by mixing 2.5 ml of a 2 M TOP-Se solution and 7.5 ml of oleylamine into the mixed solution at a rate of 0.03 ml per second.

Comparative Example 1

In the process of Example 1 above, LiHMDS was not used in the process of preparing the P precursor solution, and tetrahedral-shaped InP was formed by setting the injection temperature to 300° C.

Figure 6:
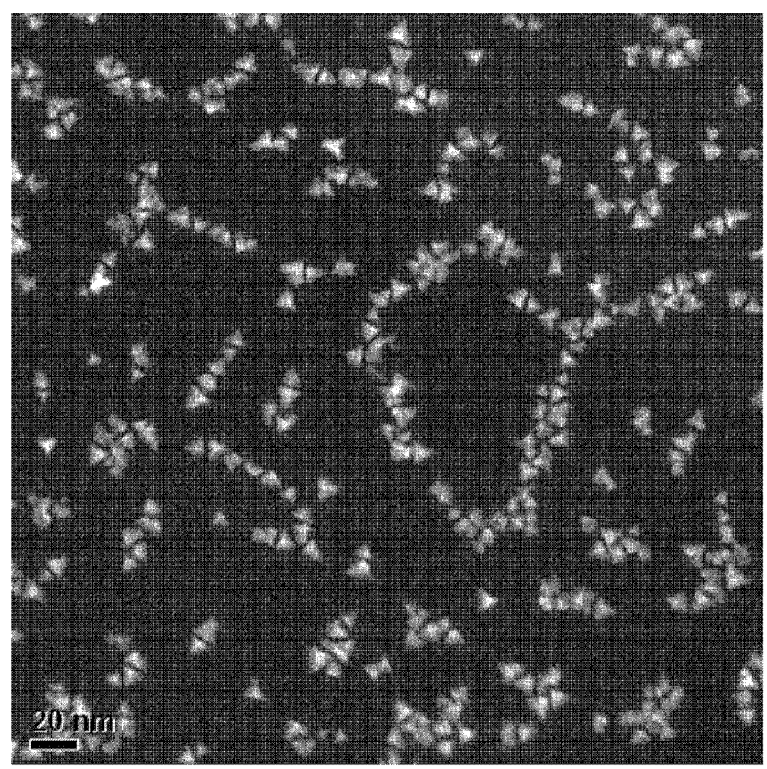
FIG. 6 is a TEM image of quantum dots according to a comparative example.

FIG. 6 is a TEM image of the quantum dots according to the above Comparative Example.

Referring to FIG. 6, when a precursor activating material (LiHMDS) is not used as in the above Comparative Example, tetrahedral-shaped quantum dots instead of tetrapod-shaped quantum dots may be formed.

Comparative Example 2

In the process of Example 1 above, the P precursor solution and the In precursor solution were heat-treated at a temperature exceeding 220° C.

Comparative Example 3

In the process of Example 1 above, the injection amount of LiHMDS was adjusted to 0.0 mmol, 0.2 mmol, and 0.4 mmol.

Experimental Example 1

(a) and (b) of FIG. 7 are TEM images of the quantum dots according to Example 1 above. Further, (a) of FIG. 8 is a TEM image of the quantum dots according to Example 1 above, (b) of FIG. 8 is a TEM image of the quantum dots according to Example 5 above, and (c) of FIG. 8 is a TEM image of the quantum dots according to Comparative Example 2 above. In this regard, detailed information of (a) and (b) of FIG. 7 is as shown in Table 3 below.

TABLE 3

|  | (a) of FIG. 7 | (b) of FIG. 7 |
| --- | --- | --- |
| Average length of arms (nm) | 6.36 | 11.83 |
| Standard deviation of arm lengths (nm) | 1.27 | 2.74 |
| Number of quantum dots | 87 | 79 |

Referring to FIGS. 7 and 8, although the quantum dots may have long arms when the quantum dots according to the above Examples are reacted at 170° C., the quantum dots may have a tetrahedral shape when the reaction temperature exceeds 220° C. as in the above Comparative Examples.

Experimental Example 2

(a) of FIG. 9 is a TEM image of the quantum dots according to Example 1 above, and (b) of FIG. 9 is a TEM image of the quantum dots according to Example 5 above. Specifically, detailed information of (a) and (b) of FIG. 9 is as shown in Table 4 below.

TABLE 4

|  | (a) of FIG. 9 | (b) of FIG. 9 |
| --- | --- | --- |
| Average thickness of arms (nm) | 2.32 ± 0.47 | 2.32 ± 0.49 |
| Average length of arms (nm) | 11.73 ± 2.66 | 12.06 ± 2.04 |
| Number of quantum dots | 87 | 79 |

Referring to FIG. 9 and Table 4, although the length or width of the arm is constantly maintained even after the quantum dots are post-treated by HF, the dangling bond on the surface of the arm is removed as described above so that the luminous efficiency may be improved.

Experimental Example 3

FIG. 10 is TEM images of the quantum dots according to Examples 4 and 6 above. Specifically, (a) of FIG. 10 is a TEM image of the quantum dots according to Example 4 above, and (b) of FIG. 10 is a TEM image of the quantum dots according to Example 6 above in which the shelling process is performed for 45 minutes. Referring to FIG. 10, it can be seen that the surface of the tetrapod-shaped quantum dots is shelled by ZnSe.

Experimental Example 4

FIG. 11 is graphs for luminescent full widths at half maximum of the quantum dots according to Example 5 above. Specifically, (a) to (c) of FIG. 11 are graphs for the luminescent full widths at half maximum of the quantum dots treated with hydrofluoric acid after changing the amounts of $(Me_2N)_3P$ and D-OLA injected.

More specifically, 0.24 ml of $(Me_2N)_3P$ and 1.76 ml of D-OLA were injected in (a) of FIG. 11, 0.12 ml of $(Me_2N)_3P$ and 0.88 ml of D-OLA were injected in (b) of FIG. 11, and $(Me_2N)_3P$ and D-OLA were not injected in (c) of FIG. 11.

Referring to FIG. 11, it can be seen that luminescent full width at half maximum, luminescence peak, and Stokes shift of the tetrapod-shaped quantum dots may be different depending on the step before forming the quantum dots and performing the hydrofluoric acid treatment.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a tetrapod-shaped quantum dot, the method comprising:
heating a first solution comprising a first precursor mixed with a first solvent;
mixing a second precursor, a second solvent, and a precursor activating material to form a second solution;
synthesizing the tetrapod-shaped quantum dot by reacting the first solution with the second solution; and
post-treating the tetrapod-shaped quantum dot,
wherein the first precursor comprises one or more of $InCl_2$, InO, CdO, $In(CH_3CO_2)_3$, $Cd(CH_3CO_2)_2$, $CdCl_2$, $Ga(C_2H_3O_2)_3$, $Ga_2O_3$, and $GaCl_3$, and
wherein the tetrapod-shaped quantum dot comprises a core comprising a plurality of arms, each of the plurality of arms having a different growth degree depending on a crystal direction.

2. The method of claim 1, wherein the plurality of arms have a plane perpendicular to a <110> crystal direction and a plane perpendicular to a <111> crystal direction.

3. The method of claim 2, wherein the plane perpendicular to the <110> crystal direction is grown in a thickness direction of each of the plurality of arms, and the plane perpendicular to the <111> crystal direction is grown in a longitudinal direction of each of the plurality of arms.

4. The method of claim 1, wherein the tetrapod-shaped quantum dot has a full width at half maximum (FWHM) value of 35 to 45 nm at a wavelength of 600 to 690 nm.

5. The method of claim 1, wherein the tetrapod-shaped quantum dot comprises one or more of InP, InAs, InSb, and GaAs.

6. A method of manufacturing a tetrapod-shaped quantum dot, the method comprising:
heating a first solution, the first solution comprising a first precursor mixed with a first solvent;
mixing a second precursor, a second solvent, and a precursor activating material to form a second solution;
synthesizing the tetrapod-shaped quantum dot by reacting the first solution with the second solution; and
post-treating the tetrapod-shaped quantum dot,
wherein the post-treating of the tetrapod-shaped quantum dot includes one or both of etching the tetrapod-shaped quantum dot and shelling the tetrapod-shaped quantum dot.

7. The method of claim 6, wherein synthesizing the tetrapod-shaped quantum dot includes growing arms having a plane perpendicular to a <110> crystal direction and a plane perpendicular to a <111> crystal direction at different growth rates.

8. The method of claim 6, further comprising degassing the first solution before reacting the first solution with the second solution.

9. The method of claim 6, wherein synthesizing the tetrapod-shaped quantum dot is performed at 100 to 220° C.

10. The method of claim 6, wherein the post-treating of the tetrapod-shaped quantum dot includes etching the tetrapod-shaped quantum dots by one or more of HF, $C_4H_9OH$, and trioctylphosphine oxide.

11. The method of claim 6, wherein the post-treating of the tetrapod-shaped quantum dot includes shelling the tetrapod-shaped quantum dot by one or more of Zn, Cd, Se, and S.

12. The method of claim 6, wherein the precursor activating material includes one or more of lithium bis(trimethylsilyl)amide (LiHMDS), lithium tetramethylpiperidide (LiTMP), lithium acetylacetonate (LiAcac), lithium-2,2,6,6-tetramethyl-3,5-heptanedionate (LiTMHD), and diisobutylaluminum hydride (DIBALH).

13. The method of claim 6, wherein the first precursor includes one or more of $InCl_2$, InO, CdO, $In(CH_3CO_2)_3$, $Cd(CH_3CO_2)_2$, $CdCl_2$, $Ga(C_2H_3O_2)_3$, $Ga_2O_3$, and $GaCl_3$.

14. The method of claim 6, wherein the first solvent and the second solvent each include one or more of oleylamine, dodecylamine, hexadecylamine, octadecylamine, octylamine, and trioctylamine.

15. The method of claim 6, wherein the second precursor includes one or more of tris(dimethylamino)phosphine (DMAP), tris(diethylamino)phosphine (DEAP), sulfur-trioctylphosphine (S-TOP), sulfur-tributylphosphine (S-TBP), sulfur-triphenylphosphine (S-TPP), sulfur-trioctylamine (S-TOA), diethyl diselenide, dimethyl selenide, selenium-triphenylphosphine (Se-TPP), tris(dimethylamino)arsine, tris(diethylamino)arsine, tris(dimethylamino)antimony, $AsCl_3$, $AsBr_3$, $As_2S_3$, $As_2O_3$, $AsI_3$, and tris(diethylamino)antimony.

\* \* \* \* \*